(12) United States Patent
Peitz et al.

(10) Patent No.: US 11,283,531 B2
(45) Date of Patent: Mar. 22, 2022

(54) CALIBRATING A TRANSMITTER DEVICE

(71) Applicant: OSRAM GmbH, Munich (DE)

(72) Inventors: Christoph Peitz, Lippstadt (DE);
Andreas Zaggl, Munich (DE);
Karl-Heinz Wallwitz, Munich (DE);
Michel Stutz, Munich (DE)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 17/040,984

(22) PCT Filed: Mar. 21, 2019

(86) PCT No.: PCT/EP2019/057116
§ 371 (c)(1),
(2) Date: Sep. 24, 2020

(87) PCT Pub. No.: WO2019/192852
PCT Pub. Date: Oct. 10, 2019

(65) Prior Publication Data
US 2021/0099240 A1    Apr. 1, 2021

(30) Foreign Application Priority Data
Apr. 4, 2018  (DE) .......................... 102018107919.2

(51) Int. Cl.
*H04B 17/11* (2015.01)
*H04B 1/04* (2006.01)
(Continued)

(52) U.S. Cl.
CPC ............... *H04B 17/11* (2015.01); *H04B 1/04* (2013.01)

(58) Field of Classification Search
CPC . H04B 1/04; H04B 7/06; H04B 10/50; H04B 17/11; H04B 17/10; H04B 17/101;
(Continued)

(56) References Cited

U.S. PATENT DOCUMENTS 8,831,633 B2 *  9/2014  Moshfeghi ............ H04W 4/021
                                                    455/456.1
9,217,787 B2 * 12/2015  Meyer ..................... G01S 5/021
(Continued)

FOREIGN PATENT DOCUMENTS

DE    102016203514 A1   9/2017
WO    2016086312 A1     6/2016

OTHER PUBLICATIONS

Gaudlitz, Eva, Wie konfiguriert man Beacons and wie installiert man sie am besten?, infsoft Blog, Apr. 1, 2016, URL: https://www.infsoft.com/de/blog-de/articleid/64/wie-konfiguriert-man-beacons-und-wie-installiert-man-sie-am-besten, infsoft GmbH,Grossmehring, Germany.

(Continued)

*Primary Examiner* — Quochien B Vuong
(74) *Attorney, Agent, or Firm* — Viering, Jentschura & Partner mbB (57) ABSTRACT

A system and a method may be used for operating and/or calibrating a transmitter device. The system and method may include wirelessly transmitting a radio signal with identification data specific to the transmitter device and reference data. The transmitter device may transmit the radio signal with signal properties at least partially dependent on the reference data. A communication device may receive the radio signal and ascertain a distance between the transmitter device and the communication device using reception-side signal properties and the reference data ascertained from the received radio signal. A distance sensor may detect a distance between the transmitter device and the communication device. An evaluation unit may ascertain the reference data depending on the reception-side signal properties of the radio signal and the detected distance and to provide the (Continued)

ascertained reference data in the transmitter device for calibrating the transmitting device.

16 Claims, 1 Drawing Sheet

(51) Int. Cl.
*H05B 47/19* (2020.01)
*G01S 1/02* (2010.01)

(58) Field of Classification Search
CPC ........ H04B 17/15; H04W 4/02; H04W 24/08; H04W 52/16; H04W 64/003; H04W 72/0426; H04W 72/0446; H04W 72/048; H01Q 1/44; H05B 47/19; G01S 1/02; G01S 1/022; G01S 1/024; G01S 1/0426; G01S 1/0428; G01S 5/02; G01S 5/0226; G01S 7/40
See application file for complete search history.

(56) References Cited

U.S. PATENT DOCUMENTS

| | | | |
|---|---|---|---|
| 9,599,699 B2* | 3/2017 | Zeng | G01S 5/0226 |
| 9,746,541 B2* | 8/2017 | Li | G01S 1/024 |
| 10,327,109 B1* | 6/2019 | Maheshwari | H04W 4/029 |
| 10,523,033 B2* | 12/2019 | Leabman | H02J 5/005 |
| 10,708,876 B2* | 7/2020 | Knoblauch | G01S 5/02 |
| 2011/0063113 A1 | 3/2011 | Hook et al. | |
| 2014/0122017 A1 | 5/2014 | Chu | |
| 2016/0187460 A1 | 6/2016 | Zeng et al. | |
| 2016/0381582 A1 | 12/2016 | Li et al. | |
| 2019/0045605 A1 | 2/2019 | Hoefflin et al. | |

OTHER PUBLICATIONS

Hilbig, Jan, Proximity Beacons—Anwendungsmoeglichkeiten von Näherungssensoren am Beispiel einer Android Applikation, Bachelorarbeit, 2015. p. 11-14, Hochshule fuer Angewandte Wissenschaften Hamburg, Hamburg, Germany.

International Search Report issued in the corresponding international application No. PCT/EP2019/057116 dated Jul. 4, 2019, 4 pages (reference purposes only).

Office Action issued in the corresponding German application No. 102018107919.2 dated on Dec. 14, 2018, 6 pages (reference purposes only).

* cited by examiner

CALIBRATING A TRANSMITTER DEVICE

CROSS-REFERENCE TO RELATED APPLICATIONS

The present application is a national stage entry according to 35 U.S.C. § 371 of PCT application No.: PCT/EP2019/057116 filed on Mar. 21, 2019; which claims priority to German Patent Application Serial No.: 10 2018 107 919.2 filed on Apr. 4, 2018; all of which are incorporated herein by reference in their entirety and for all purposes.

TECHNICAL FIELD

A method for operating a transmitter device wirelessly transmitting a radio signal with identification data specific to the transmitter device and reference data is disclosed. A system with a transmitter device configured to wirelessly transmit a radio signal with identification data specific to the transmitter device and reference data is also disclosed.

BACKGROUND

Methods, systems as well as lighting devices of the generic type are fundamentally extensively known in the prior art such that a separate printed evidence is not required hereto. Rooms, for example outside or also within buildings, are illuminated by lighting devices in presettable manner to allow or support an intended use. Lighting devices are increasingly employed, which besides the intended function of light emission also comprise a transmitter device, which is at least formed to wirelessly transmit specific identification data, for example in the manner of broadcast. This transmitter device is formed to transmit the radio signal in the manner of near field radio. Such a transmitter device is also referred to as "beacon" in the prior art.

So-called beacons can be combined with lighting devices to be able to provide lamp-specific or also other information by means of their radio signal. The beacon technology is based on a transmitter system or on a transmitter-receiver system. A beacon (also Leuchtfeuer, Barke, Peilsender or the like in German) is a small, mostly battery-operated transmitter, which transmits a radio signal, in definable time intervals, for example based on a Bluetooth Low Energy standard (BLE), ZigBee or the like.

The radio signal of a beacon is characterized by the identification data, which for example includes a unique identification number, also called Universally Unique Identifier (UUID) in English. Beacons can be used to associate an, in particular digital, identification to objects and/or locations. Objects, at which a beacon is installed, as well as also locations, at which a beacon is installed, for example on a wall or on a ceiling, can be identified by communication devices, in particular communication terminals, for example smart phones, laptops and/or the like, in the signal field of the beacon in this manner.

In this manner, with the aid of the beacon, a location can for example be identified and a localization can be performed, respectively. By arranging one or more beacons in a preset area, for example a building area or the like, a type of radio-based raster can be provided, which allows a communication device located in this area to be able to ascertain an own position by means of its radio interface, in particular a BLE interface, as well as corresponding evaluation possibilities. Therein, the individual identification data of the installed beacons associates an identifier to a respective location, based on which the communication device can, at least approximately, ascertain its position. Basically, a communication range of a respective beacon can be ascertained in any case.

By suitable evaluation, for example using preset algorithms or the like, the accuracy of the ascertained position, for example by evaluating a signal strength of the radio signal and/or the like, can be improved. Hereto, the communication device can access data of a data storage, for example via a separate communication network like the Internet, a mobile radio network and/or the like. The data storage can for example be a Cloud server or the like. Here, the identification data and associated position data can for example be registered in a corresponding database in the manner of map data.

If the communication device comes in communication range to the transmitter device or the beacon, the communication device can thus ascertain the own site based on the ascertained identification data for example via server query. Using further radio signals of further transmitter devices or beacons, the accuracy can be further improved by means of localization algorithms, in particular, from a reception field strength of a respective one of the radio signals of the transmitter devices or the beacons, a distance to the respective transmitter devices or to the respective beacon can be ascertained.

Basically, transmitter devices or beacons can be installed at lighting devices in illumination systems in the lighting technology. Therein, the advantage is in particular utilized that a light installation can provide a permanent energy access to be able to supply the transmitter device or the beacon with electrical energy. Therefrom, the advantage results that the transmitter device or the beacon does not require an own energy supply in the form of a battery or the like and thus a corresponding maintenance effort can be at least partially avoided. Moreover, this configuration allows that settings of the transmitter device or the beacon can also be selected, which can entail a high energy consumption without this having to have effects on an operating duration of the transmitter device or the beacon. Moreover, installation processes of such transmitter devices or beacons and of the lighting technology can be unified. A further advantage is a defined locking position of the transmitter device or the beacon, which is selected such that the transmitter device or the beacon is protected from manipulation. Thereby, a reliably secure identifier can be associated with a location.

An overview over use potentials of the integration of a transmitter device or a beacon in a lighting device is apparent from the following non-conclusive enumeration:

- The energy supply of the light installation can be used instead of an energy supply by a battery to for example reduce lifecycle cost of the transmitter device or the beacon.
- The electrical energy supply of the illumination system or of the lighting device can be used to adapt transmission parameters of the signal of the transmitter device or the beacon to the service and not to an available residual amount of energy and parameters of the battery, respectively. Frequent transmission cycles for example generate a high accuracy of a respective service, but this can also result in increased energy consumption.
- The exchange of the battery of conventional transmitter devices or beacons bears risks, namely for example with regard to errors in the handling.
- A non-availability of services can be avoided by an uninterrupted energy supply of the transmitter device or the beacon.

An installation location below a ceiling can be advantageous for a signal propagation of the signal of the transmitter device or the beacon.

An installation location below the ceiling can make the overall system more robust against disturbances and shadings, respectively, by other objects at the level of a floor level in contrast to an installation of the transmitter device or the beacon itself at the level of the floor level.

The transmitter device or the beacon can be protected from manipulations and unauthorized accesses, respectively—whether unintentional or intentional.

The illumination system as well as also services such as for example localization services or the like can be offered as an overall system "from a single source".

Moreover, there is the possibility of using a secure communication network of the illumination system to for example configure the transmitter device or the beacon or to link the transmitter devices or the beacons with each other.

A unification of installation processes of transmitter devices or beacons and of the illumination system can be allowed.

Furthermore, there is the possibility of coupling to further system elements of a peripheral building infrastructure via the communication network of the illumination system, for example to elements of the safety technology and/or the like.

An optically attractive illumination system can be provided since the transmitter device or the beacon can be non-visibly arranged in the respective lighting device or in the illumination system.

A beacon can be integrated in the lighting device as a transmitter device. Then, the lighting device also includes one or more illuminants besides the beacon or the transmitter device, to be able to provide the desired illumination function. The beacon or the transmitter device on the one hand and the lighting device on the other hand can be in communication link with each other. The beacon or the transmitter device is arranged integrated in the lighting device, in particular in a common housing. Thus, a separate housing does not have to be provided for the beacon or the transmitter device. Thereby, the beacon or the transmitter device can be arranged protected at the same time such that the intended function can be provided with high reliability.

The beacon or the transmitter device is formed to wirelessly transmit the radio signal with the identification data specific to the beacon or the transmitter device. The transmission is effected by radio using the BLE standard. The beacon or the transmitter device further includes a control unit, which can include a computer unit as well as a storage unit. In the storage unit, an executable computer program can be stored, which is available for the computer unit such that a preset control functionality can be realized by means of the computer unit, in particular also with respect to the transmission of the radio signal.

The beacon or the transmitter device can further be in communication link with further local beacons or transmitter devices. The communication link can also be formed as a wireless communication link, also according to the BLE standard. However, a wired communication link can also be provided. The communication link between the beacon or the transmitter device and the further beacons or transmitter devices is bidirectional such that signals, in particular data, can be exchanged.

Moreover, the transmitter device or the beacon can be connected to a data infrastructure device via a further communication link. The data infrastructure device can serve for controlling a system of a plurality of lighting devices. The data infrastructure device can for example at least partially also include the Internet, a center, in particular also a central service server and/or the like. The data infrastructure device can further serve for controlling and/or communicating data.

The beacon or the transmitter device can be formed as a pure transmitter device for transmitting radio signals in the manner of broadcast or else as a combined transmission-reception device, which also allows a reception of radio signals besides the transmission of radio signals in the manner of a broadcast operation or even allows a bidirectional communication with the communication device. The radio signal of the transmitter device or of the beacon can be received by means of the communication device.

According to an example of use, users and appliances, respectively, can optionally have the challenge to have to orient themselves, to navigate or to locate or intend to use other local digital services within a region, such as for example apps, app functions, Google Maps, Lightify, light control and/or the like. The illumination system with integrated beacons in a preset region can become a localization and orientation system, respectively, for these potentials of use. With a self-localization of the communication device realizable thereby, services can now be provided, for example a navigation, provision of location-specific information, services and/or the like.

An aspect of the beacon technology is the possibility of configuration of typical parameters such as for example a signal strength, a transmission interval and/or the like of the beacon. With different configurations, different scenarios of application can be individually supported. For example, if a high service quality with respect to an accurate localization in short intervals is desired, for example in indoor navigation, very short transmission intervals can for example have to be configured.

In particular in digitally controlled illumination systems, for example using Digital Addressable Lighting Interfaces (DALI), it should be possible to uniquely identify, which illuminant or which lighting device is arranged at which location, to allow an exact control of the lighting devices or the illuminants thereof in a certain region by means of digital light control. Hereto, the lighting devices require a unique address, which reflects their position in a preset region. The expert terms such an association of lighting devices with corresponding positions or addresses as "commissioning". Herein, multiple information should be combined, namely unique identification information of a respective lighting device, in the manner of unique specific identification data, an installation location of the respective lighting device in a preset region, that is a physical address of the lighting device, as well as an identifier of the lighting device, that is for example its digital address.

The digital address of a lighting device can for example be communicated to a control or data processing via a power line communication or a similar power-based communication solution via the energy distribution. The lighting device or a ballast of the lighting device can thus sign up at the control with the digital address. However, the information, at which physical location in the preset region the lighting device is actually arranged, is thereby not yet available. However, this information is required if only a defined region is to be illuminated, for example only a conference room or a part thereof or the like.

At present, lighting devices or illuminants and at the same time the site thereof usually cannot be readily electronically identified. Typically, it can only be recognized via a label or an impressing, for example on a housing of the lighting device, which type of the lighting device or the illuminant it is. Another expensive possibility is in causing each digitally signed up lighting device within the scope of the illumination system to individually blink and in manually marking position information in a layout.

In order to efficiently connect lighting devices and/or illuminants within the scope of the illumination system to a light management system (LMS), it would be advantageous to have available one or more electronic and digital identification numbers, respectively, for recognizing the overall system or individual components of the overall system.

Further, a specific problem is in that positions of the lighting devices or illuminants are usually set in an installation plan for an illumination region and service region, respectively. This presets to an installer, which of the delivered and commissioned lighting devices, respectively, for example with respect to a lamp type or the like, are to be arranged in which position of the region, for example the building, corresponding to the installation plan.

Location-related services and services such as for example navigation of a user or the like, respectively, by means of beacons should be available to the user in a preset region in permanent manner and without restriction. Besides an uninterrupted electrical energy supply, this also requires regular maintenance and optionally also update of computer programs such as for example the firmware or the like, respectively.

Services using a beacon, such as for example a navigation by means of a communication device, should be available to the users in permanent manner and without restriction if possible. Among other things, this requires an uninterrupted energy supply for the beacons. Nevertheless, it has turned out to be an impediment that communication terminals are usually formed for a preset, in particular proprietary, communication protocol. The communication protocols, which are employed in the meantime, are usually based on the BLE standard as the radio standard. Depending on the respective communication protocol specific to communication terminal, the communication terminals partially respond quite differently. A beacon protocol established therein is for example the "iBeacon" Protocol® of the company Apple Inc. Communication terminals based on the operating system iOS® of the company Apple Inc. can for example receive and process a radio signal according to the iBeacon Protocol®. Moreover, further such beacon protocols are known, thus for example "Eddiestone"® of the company Google or the beacon protocol "AltBeacon", which is an open source protocol. In order to be able to allow an application of the beacon technology as wide as possible, it can thus be required to employ multiple beacon protocols in parallel. This increases the problem for the production of the beacons, in particular with regard to the energy supply thereof as well as the possible reliable provision of a respective service and the like. Of course, there is the possibility to provide an own, adapted beacon for each beacon protocol. However, this proves to be expensive, in particular with respect to the energy supply and/or constructive aspects, which relate to the spatial arrangement of the beacon. Moreover, the number of the specific identification data would be correspondingly increased.

For example, if an operator of a supermarket wishes to ensure that the offered services such as for example a navigation of a customer through the supermarket or the like are available for each customer with any communication device in unrestricted manner, adapted beacons would have to be installed corresponding to the possible communication devices specific to manufacturer and specific to operating system, respectively. However, this results in the fact that for example with two beacon protocols, at least twice as many beacons would have to be installed. Thereby, high investment cost, high lifecycle cost due to a respective battery exchange, a high installation effort as well as also a high equipment effort for setting a respective beacon protocol and the like result. Moreover, problems in the signal processing by the communication devices can also arise if the different beacons are for example not matched to each other or the like with regard to a transmission point of time or a radio signal strength or the like.

In order to be able to realize the localization functionality using transmitter devices or beacons, it can be provided that a distance of the communication device to a respective one of the transmitter devices or beacons is ascertained. For example, using trilateration or the like, a position of the communication device can be ascertained. In order to be able to ascertain a respective distance, the communication device uses signal properties of the respectively received radio signal as well as the reference data contained in the respective radio signal. With the reference data, it is possible to ascertain the distance to the respective transmitter device or to the respective beacon based on the signal properties, which have been ascertained based on the received radio signal.

However, the practice has shown that the ascertainment of the distance by the communication device is subjected to inaccuracies. Thus, it proves to be problematic on the one hand that the transmitter devices or the beacons usually use multiple radio channels to transmit their respective radio signal. Therein, it has been shown that the transmission power of the radio signal, which is emitted by the transmitter device or the beacon, is not uniform in the respective radio channels and therefore can rather deviate from each other with respect to the radio channels. Moreover, a mounting location of the transmitter device or the beacon can also make itself noticeable as disturbing in that for example reflections can be generated, the radio signal is attenuated and/or the like. Besides further influences, this can result in partially large deviations in ascertaining the distance between the transmitter device or the beacon on the one hand and the communication device on the other hand. Therein, it is usually provided that the transmitter device or the beacon is already adjusted to preset values, in particular with respect to the reference data, on the side of production. Thus, calibration occurs at most only once during the production process.

SUMMARY

Therefore, an object of the disclosure is to improve the operation of the transmitter device or the beacon, in particular in combination in a system with the communication device.

With respect to a generic method, it is in particular proposed that for calibrating the transmitter device, the distance between the transmitter device and the communication device is detected independently of the radio signal, the reference data is ascertained depending on the reception-side signal properties of the radio signal and the detected distance, and the ascertained reference data is provided in the transmitter device for calibrating the transmitter device.

On the system side, it is in particular proposed for a generic system that the system comprises a distance sensor for detecting the distance between the transmitter device and the communication device independently of the radio signal, and an evaluation unit, which is formed to ascertain the reference data depending on the reception-side signal properties of the radio signal and the detected distance and to provide the ascertained reference data in the transmitter device for calibrating the transmitter device.

With respect to a generic lighting device, it is in particular proposed that the lighting device comprises a transmitter device of the system.

The ascertainment of the distance between the transmitter device and the communication device may be based on the radio signal can be improved in that the reference data transmitted by the transmitter device together with the radio signal is adapted or calibrated in suitable manner such that in evaluating the signal properties of the received radio signal by the communication device considering the reference data, which can also be ascertained from the radio signal, the ascertainment of the distance can be improved. For this purpose, it is provided that the reference data is adapted or calibrated in suitable manner such that disturbing influences can be better considered by the reference data. Thus, the reference data is no longer fixedly set—as in the prior art—but it is optionally suitably adapted if needed also after assembly of the transmitter device or the beacon. Thereby, the transmitter device or the beacon can be calibrated.

Thereby, assembly-specific peculiarities can be considered, which can affect the radio signal and thereby impair the accuracy of the ascertainment of the distance. Thus, it does not have to be intervened in a transmission unit as such for example by correspondingly adapting a transmission power or the like. Rather, the radio signal remains substantially unchanged with respect to its transmission properties in transmitting by the transmitter device. Rather, reference data is contained in the radio signal. The radio signal as such, which can usually for example be provided by a carrier signal, thus, only has to be differently modulated, namely in that the corresponding reference data, which is modulated onto the radio signal, is correspondingly adapted. Thereby, a very simple adaptation of the transmitter device or the beacon to local conditions can be achieved, whereby the ascertainment of the distance between the transmitter device or the beacon on the one hand and the communication device on the other hand in the intended operation can be considerably improved based on the radio signal. Moreover, after-effects may also be considered afterwards, which can for example occur during the intended operation of the transmitter device or the beacon, for example if constructional variations or the like are performed. Thereby, a retrofit or a reconstruction is also possible.

Thus, the hardware-side variations at the transmitter device or the beacon do not have to be performed. Only the reference data has to be accessed, which is adapted in suitable manner such that the distance measurement based on the radio signal in the intended operation of the transmitter device or the beacon can be realized as accurately as possible.

The reference data can be digital data, which indicates certain properties of the radio signal under certain normalized conditions. Thus, it can for example be provided that the reference data indicates, which field strength the radio signal has in a preset distance of one meter to the transmitter device or to the beacon in the undisturbed case. Moreover, the reference data can of course also include a transmission power or the like. Combinations hereof can also be provided. In the undisturbed case, a distance between the communication device and the transmitter device or the beacon can thus be ascertained from a reception field strength at the communication device. Therein, it can be considered that a reception field strength can be dependent on the actual distance between the communication device and the transmitter device or the beacon according to a preset characteristic in the undisturbed case.

In order to be able to consider disturbing influences, the reference data may also be adapted. For example, if the radio signal is attenuated by constructional equipments or the like in undesired manner, this can be correspondingly considered by adapting the reference data. Thereby, it is possible on the communication device side to considerably more accurately determine the actual distance based on the radio signal using the adapted reference data. The reference data can be stored in a storage unit of the transmitter device or of the beacon.

Now, in order to correspondingly calibrate or adjust the transmitter device or the beacon, it is provided that the distance between the transmitter device and the communication device is detected independently of the radio signal. For this purpose, a correspondingly suitable distance sensor can be provided, which for example optically or also metrically allows detecting the distance. For ascertaining this distance, thus, the radio signal of the transmitter device is not used. Rather, the detection of the distance is effected independently hereof. Then, the reference data is ascertained depending on the reception-side signal properties of the radio signal and the detected distance. Thus, the reception field strength is for example ascertained here and associated with the distance. Hereby, the transmission power or also a reception field strength in a normalized distance can then for example be ascertained using further physical models or the like. Based on this ascertainment, the reference data can then be ascertained, which is provided, in particular stored, in the transmitter device.

This functionality with respect to the calibration can be at least partially performed in the communication device or also in the transmitter device. For this purpose, suitable evaluation units can be at least partially provided in the communication device and in the transmitter device, respectively. Of course, it can also be provided that both the communication device and the transmitter device perform a respective evaluation and allow data exchange via a bidirectional communication link to achieve redundancy with respect to the ascertainment of the reference data in this manner.

The signal properties of the radio signal can in particular include a reception field strength, an amplitude, a power, a frequency, a modulation method and/or the like.

Overall, the transmitter device or the beacon may be calibrated such that the distance measurement can be considerably more accurately realized.

It is further proposed that the transmitter device transmits a preset initial radio signal as the radio signal for calibration. Herein, the idea is pursued that reference data is optionally not yet available on production side, which can be transmitted by means of the radio signal. Therefore, the initial radio signal can be provided, which can be transmitted independently of the presence of possible reference data. The initial radio signal can have preset fixed signal properties, which allow to be able to ascertain the reference data using reception-side signal properties with respect to the initial radio signal. This in particular proves to be advantageous for the production of the transmitter device or the beacon because corresponding reference data does not have to be provided on production side. Moreover, this development can of course also be used to use standardized or normalized reference data, which is provided in the transmitter device or the beacon on production side, for generating the initial radio signal.

Further, it is proposed that the transmitter device transmits the radio signal on at least one of multiple radio channels, the reference data includes reference data specific to radio channel, which is associated with the respective at least one radio channel, and the transmitter device uses the reference data specific to radio channel associated with the respective radio channel for generating the radio signal for the respective at least one radio channel. This development is based on the idea that with a plurality of radio channels, which the transmitter device or the beacon uses to transmit the radio signal, the signal properties of the radio signal can also be dependent on the respective radio channel. This can for example arise in that different radio channels are associated with different frequency ranges and disturbances cannot affect each one of the radio channels to the same extent. Thereby, it is of course advantageous if the radio signal of a respective radio channel can be adapted such that the distance measurement can be realized nearly independently of the respective radio channel. Thus, deviations specific to radio channel may also be compensated for.

Correspondingly, this development provides that own reference data can be provided for each one of the radio channels or also for groups of radio channels, which can be specific to the respective radio channel or the respective group of radio channels. Thereby, a better adaptation and a better accuracy can be achieved in particular with multiple radio channels. In a non-limiting embodiment, the respective reference data specific to radio channel can be individually adjusted. Of course, it can also be provided that adjustment of the reference data specific to radio channel is only partially possible, for example with respect to a reception field strength in a normalized distance or the like. In contrast, other reference data, for example with respect to a transmission power or the like, can be unalterable, in particular also considering that the transmission power is not to be adjusted.

In a non-limiting embodiment, it is provided that the calibration is performed for at least one of the radio channels. Of course, the calibration can also be performed for a group of radio channels or also for all of the radio channels. With multiple radio channels, the calibration can be sequentially performed, wherein the respective radio channels are calibrated one after the other. However, it can also be provided that the radio channels are at least partially calibrated at the same time. Overall, an effective calibration of the transmitter device can be achieved.

In a non-limiting embodiment, the calibration can be effected with detection of at least two distances to positions of the communication device different from each other with respect to the transmitter device. Thereby, the accuracy, with which the reference data is ascertained, can be further increased. Thus, it is for example possible to detect a first distance between the communication device and the transmitter device or the beacon by means of the distance sensor and to ascertain the signal properties of the received radio signal for this distance. In a further step, a second distance between the communication device and the transmitter device or the beacon can then be established and a new ascertainment of the signal properties of the radio signal can be effected. Further, this development allows that statistical approaches can be additionally considered, whereby the ascertainment of the reference data can be even further improved. Of course, more than two distances can also be used to be able to ascertain the reference data.

Further, it is proposed that the calibration is repeated. The repetition can be effected at presettable points of time or also upon preset events, for example if constructional variations or the like are performed. Moreover, the repetition can also be performed to for example be able to consider ageing of the transmitter device or the beacon. Thus, maintenance intervals can for example be preset, in which the transmitter device or the beacon is newly calibrated. Thereby, the reliability of the intended operation of the transmitter device or the beacon can be further improved.

Furthermore, it is proposed that the reference data is ascertained using a table with preset values for the reference data. Hereby, the ascertainment of the reference data can be considerably simplified. The table with the values for the reference data can for example be stored in the communication device or else in the transmitter device or the beacon itself. In order to ascertain the reference data, only a corresponding dataset has to be selected in this case, which is then activated and used by the transmitter device for transmitting the radio signal. Even if a discretization with respect to the calibration or adjustment is achieved hereby, this development proves to be advantageous in that the adjustment as such can be particularly simply realized. Namely, only the corresponding suitable dataset for the reference data has to be selected from the table and activated.

Moreover, it is proposed that the reference data is ascertained using a mathematic formula. The mathematic formula can reflect the physical conditions in the real operation. Based on the mathematic formula, the evaluation can be effected to the effect that the reception-side signal properties are made available on the one hand and the actually detected, in particular measured distance on the other hand. The corresponding reference data can then be ascertained by means of the formula. Of course, this development can also be combined with the previously described functionality of the table. Thus, it can be provided that intermediate values can be interpolated by means of the mathematic formula. Thereby, the accuracy of the calibration or adjustment can be further improved.

According to a development, it is proposed that the reference data is ascertained by the communication device and communicated to the transmitter device. Thus, the transmitter device does not have to provide an evaluation functionality. It only has to comprise a reception unit, which is suitable to be able to receive the corresponding reference data. Of course, it can correspondingly be provided that an authentication has to be effected in order that third parties cannot access the reference data in unauthorized manner. Hereto, suitable encryption methods can be used.

Moreover, it can be provided that the communication device communicates the reception-side signal properties of the radio signal for ascertaining the reference data by the transmitter device to the transmitter device. In this development, it is provided that the evaluation is effected by the transmitter device itself. In this case, the communication device does not have to provide an evaluation functionality. It only has to be able to ascertain the reception-side signal properties and to communicate them to the transmitter device or to the beacon by means of an own transmission unit. At the same time, the detected distance is of course also to be communicated to the transmitter device. Then, the transmitter device itself can ascertain and provide the reference data.

It is further proposed that the transmitter device is operated in a calibration mode for calibrating. Hereby, it can be achieved that the transmitter device or the beacon cannot be accessed at any arbitrary point of time. Rather, it can be achieved by the calibration mode that the transmitter device or the beacon can only be adjusted or calibrated with respect to the reference data in this mode. It can be provided that the calibration mode can only be adopted if the transmitter device or the beacon obtains a corresponding suitable control signal. The control signal can serve for authenticating, that is that an authorization is present to be allowed to change the reference data or the like. The control signal can for example be a radio signal, a light signal and/or the like. Moreover, the control signal can of course also be provided by manual actuation at the transmitter device or the beacon. Thereby, undesired access to the transmitter device or the beacon by unauthorized third parties can be reduced.

A development provides that the reference data for the transmitter device is at least partially provided by means of a center. In this configuration, thus, the reference data does not have to be communicated immediately from the communication device to the transmitter device. In particular, the evaluation functionality does not have to be realized neither in the communication device nor in the transmitter device or the beacon. Rather, the communication device can communicate the required data to the center, which performs the evaluation and ascertains the corresponding reference data. The center can then make available the thus ascertained reference data to the transmitter device or the beacon via a communication link. Thereby, both the communication device and the transmitter device or the beacon can be technically realized as simply as possible.

The transmitter device or the beacon can also be arranged at a lighting device or in a lighting device. Thereby, the transmitter device or the beacon can be supplied with electrical energy via the lighting device such that a separate own energy supply can be saved. At the same time, there is the possibility of being able to arrange the transmitter device or the beacon in protected manner by this development. Moreover, separate own assembly possibilities do not have to be provided for the transmitter device or the beacon, by which the transmitter device or the beacon would have to be attached in isolated manner.

The advantages and effects specified for the method similarly apply to the system and the lighting device and vice versa. Insofar, device features can also be formulated for method features and vice versa.

BRIEF DESCRIPTION OF THE DRAWINGS

Further advantages and features are apparent from the following embodiments based on the attached figures. In the Figs., identical reference characters show identical features and functions.

DETAILED DESCRIPTION

Figure 1:
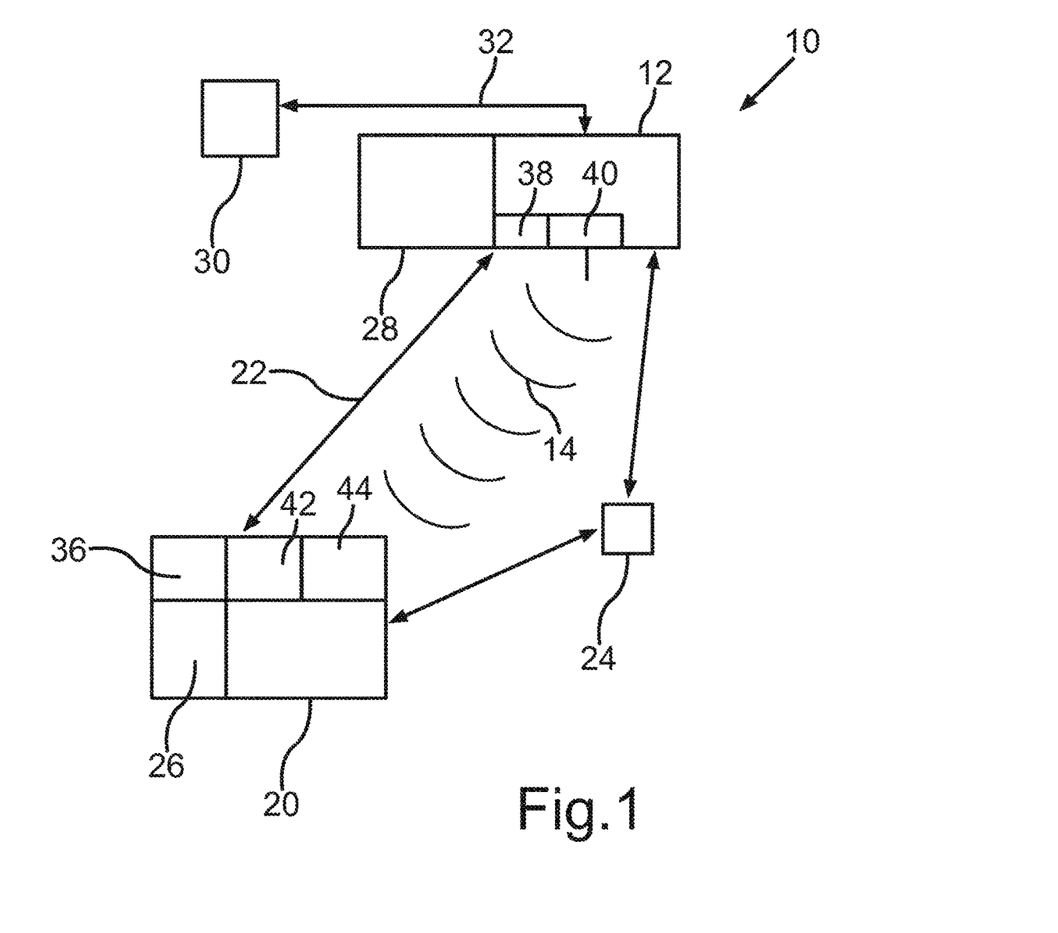
FIG. 1 depicts a system in a schematic block representation, in which a beacon is arranged immediately at a lighting device.

FIG. 1 shows a system 10 with a beacon as a transmitter device 12 as well as a communication device 20 in a schematic block representation. The beacon 12 is arranged immediately at a lighting device 28 and is supplied with electrical energy for the intended operation via the lighting device 28.

Figure 2:
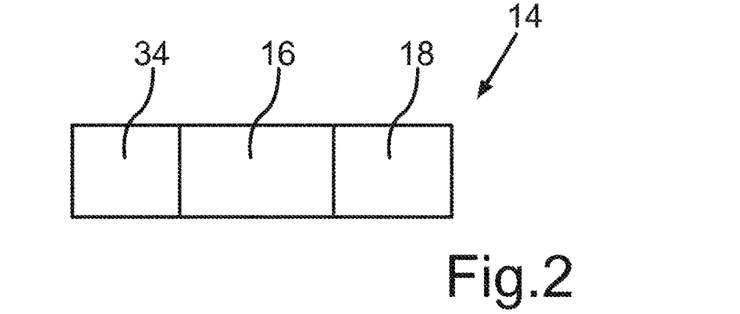
FIG. 2 depicts a schematic representation of a radio signal of the beacon according to FIG. 1.

The beacon 12 is formed to wirelessly transmit a radio signal 14 with identification data 16 specific to the beacon 12 and reference data 18 (FIG. 2). The radio signal 14 is transmitted by the beacon 12 with signal properties, which presently are dependent on the reference data 18. Presently, the signal properties are a reception field strength in a normalized distance to the beacon 12 of 1 m. The reception field strength in the normalized distance is contained in the radio signal 14 in the form of digital data as reference data 18 (FIG. 2).

FIG. 2 exemplarily shows a schematic construction of the radio signal 14, as it is continuously transmitted in intermittent manner in a preset time interval of about 20 milliseconds as a broadcast signal from the beacon 12. The radio signal 14 includes a carrier not illustrated in the manner of an electromagnetic wave with a preset frequency, onto which the corresponding data is modulated by means of a modulation method. Presently, it is provided that a QAM modulation is employed as the modulation method. Modulation methods are fundamentally known to the expert such that a detailed explanation can be omitted at this point.

The data of the radio signal is presently digital data, which is encoded in suitable manner such that the radio signal 14 can be modulated corresponding to the data by means of the modulation method. It is apparent from FIG. 2 that the data comprises a header 34, which is selected typical to the radio signal and allows the communication device 20 to receive the radio signal 14 by means of a reception unit 26 of the communication device 20 and to ascertain the beginning of the radio signal to demodulate the radio signal 14 in intended manner. Thereby, the data contained in the radio signal 14 can be ascertained. For this purpose, a suitable decoding can be additionally provided.

As is apparent from FIG. 2, a data area adjoins to the header 34 with specific identification data 16, which has been individually assigned to the beacon 12. Thereby, the beacon 12 can be identified.

The identification data 16 is followed by the reference data 18, which is used by the communication device 20, as is explained in the following, to ascertain a distance 22 between the beacon 12 and the communication device 20.

Hereto, it is provided that the communication device 20 receives the radio signal 14 by means of the reception unit 26 and ascertains the distance using reception-side signal properties and the reference data 18 ascertained from the received radio signal 14. For this purpose, the reception field strength of the radio signal 14 is ascertained as the reception-side signal property. This can be effected by means of the reception unit 26. A first evaluation unit 36 receives a signal corresponding to the reception field strength of the radio signal 14 as well as the reference data 18 ascertained from the radio signal 14 from the reception unit 26. Based on the ascertained reference data 18 and the reception field strength, the distance 22 is ascertained by means of a preset algorithm. The communication device 20 can use it to ascertain its position with respect to the beacon 12.

Besides the above explained data, the radio signal 14 can also include further data if needed.

Presently, the reference data 18 is stored in a storage unit of the beacon 12 not illustrated. A transmission/reception unit 40 is formed to generate the radio signal 14 using the reference data 18 and to transmit it as a broadcast signal 14. Therein, it has been shown that the radio signal 14 can be impaired, in particular attenuated or also disturbed, by environmental influences such that the ascertainment of the distance 22 with the communication device 20 becomes inaccurate or even can entail an unusable result. Therefore, there is the wish to achieve an improvement here.

As an improvement, the beacon 12 may be calibrated. For this purpose, a distance sensor 24 is provided, which serves for detecting the distance 22 between the beacon 12 and the communication device 20 independently of the radio signal 14. Presently, the distance sensor 24 is an optical sensor, which can be arranged at the communication device 20 and which detects the distance to the beacon 12 by means of a light signal. This detected distance value is made available to the communication device 20.

The beacon 12 transmits the radio signal 14, which is received by the reception unit 26 of the communication device 20. Here too, the reception field strength is again ascertained as the reception-side signal property. For the purpose of calibration, however, the reference data 18 of the radio signal is now not used, but rather the actual distance 22, which has been detected by means of the distance sensor 24. Based on this distance, a second evaluation unit 42, which is presently arranged in the communication device 20, ascertains new reference data 18, which would have to be contained in the radio signal 14 in order that the communication device 20 can correctly ascertain the distance 22 also without the distance sensor 24. Hereto, a mathematic formula can be used, which sufficiently reliably describes the physical propagation conditions for electromagnetic waves in the concerned range.

The reference data 18 ascertained in this manner is communicated from a transmission unit 44 of the communication device 20 to a reception unit 38 of the transmission/reception unit 40 of the beacon 12 via a communication link not further illustrated. The transmission/reception unit 40 receives the reference data 18 and stores it in the storage unit instead of the present reference data. Thereby, a radio signal with corrected reference data 18 can now be transmitted by the beacon 12 such that the actual distance 22 between the communication device 20 and the beacon 12 can be reliably and accurately ascertained also without the distance sensor 24 in future distance measurements by means of the communication device 20.

In a modification of the above mentioned embodiment, it can be provided that the reference data is provided via a center 30, which is in communication link with the beacon 12 via a communication link 32. In this case, the beacon 12 only needs a transmission unit instead of the transmission/reception unit 40, because the reference data 18 is provided by the center 30. For calibrating, it is provided in this case that the transmission unit 44 of the communication device 20 does not communicate the ascertained new reference data 18 immediately to the beacon 12, but instead to the center 30. For example, this can be effected via a communication network like the mobile radio network or the like.

Presently, the communication device 20 is a smart phone, which includes a corresponding app for the purpose of ascertaining the distance 22. Similarly, it is provided that a corresponding app is installed on the smart phone for calibrating the beacon 12.

For the purpose of calibration, a model, a conversion formula or a table is created before the calibration, in which measurement values are recorded. In a laboratory or in a test field, the measurement values can be generated with respect to a defined distance, for example with respect to a preset standardized distance, which can for example be 1 m. This is performed with respect to a preset transmission power of the beacon 12. After an installation of the beacon 12 at an intended location, an adapted calibration value or reference data 18 can be ascertained and adjusted in automated manner with the aid of the model or the table in connection with the measurement values and the actual distance or the distance detected by means of the distance sensor between the beacon 12 and the communication device 20, to calibrate the beacon 12.

In the present configuration, it is provided that the beacon 12 of the system 10 is arranged in a housing of the lighting device 28 not further illustrated, whereby the beacon 12 is not readily reachable. Presently, the beacon 12 is formed to use the BLE standard with respect to the transmission of the radio signal 14. Alternatively, a WiFi standard or the like can also be used. Therein, the beacon 12 is configured such that it can be addressed via the communication device 20. Hereto, both the communication device 20 and the beacon 12 can include corresponding control units, which can provide a data processing as well as a data storage. However, this is not illustrated in the Figs.

For the purpose of calibration, the communication device 20 can be arranged in an actual, real fixed distance to the beacon 12. With a fixed installation, this distance can be fixedly defined. With a manually held positioning, the communication device 20 should not be moved, if possible, to impair the functionality of calibration as little as possible. By means of an algorithm for representing the model, formulas for calculating and/or the like, the reference data 18 can then be ascertained. This can be effected using data processing.

Further, the communication device 20 comprises the reception unit 26 as well as the transmission unit 42, which are configured corresponding to the above mentioned communication standard in order that a communication link between the beacon 12 and the communication device 20 can be established. In a non-limiting embodiment, this can be controlled via an app.

The measurement of the distance 22 by means of the distance sensor 24 can be effected using cameras, sound detectors, light-based range finders and/or the like. By means of an algorithm for distance evaluation, the distance 22 can be ascertained. Moreover, there is the possibility that a reflection signal can be evaluated by means of a reference signal transmitter, for example based on sound, radio or the like. Further, a data storage can be provided, in which the new reference data 18 can be stored, and which can serve to store data to an algorithm for representing the model and formulas for calculating the reference data 18, respectively.

For example, the center 30 can include an external server including a data storage. Insofar, the center 30 can also include data, in particular the reference data 18 as well as also tables, routines, formulas and/or models, which can serve to ascertain the reference data 18.

The evaluation of the reception field strength and of the distance 22 actually ascertained by means of the distance sensor 24 can be effected both on the communication device 20 and at the beacon 12 as well as also by the center 30. Of course, it can also be provided that the evaluation is effected on another beacon or a gateway, which are in communication link with the beacon 12. Of course, an algorithm for evaluating can also be manually effected, for example by a user of the communication device 20 or the like, for example using an app, but also in written form or the like.

The lighting device 28 can comprise general features for a distance measurement, which can for example be suitable for ascertaining the distance 22 using UWB, sound, flat surface for sound reflections and/or the like. However, the lighting device 28 can in particular be formed with visual references to be able to ascertain the distance 22 based on the visual references. For example, this can be realized by at least two defined points in a defined distance to each other, based on which the distance 22 between the lighting device 28 and thereby also the beacon 12 on the one hand and the communication device 20 on the other hand can be calculated via trigonometric functions.

A calibration of the beacon 12 using the communication device 20 may be performed, even if the distance 22 is arbitrary. If the communication device 20 is held in a preset distance 22 to the beacon 12, the distance can be ascertained by means of an auxiliary means, namely the distance sensor 24. Further, the reception field strength is measured by the communication device 20. By means of evaluation in the second evaluation unit 42, the reference data 18 can be ascertained from the reception field strength and the measured distance 22 using the algorithm. Hereto, it can be provided that according to a first variant, corresponding reference data is listed in a table depending on the reception field strength and the ascertained distance. Intermediate values can be ascertained by interpolation. According to a second variant, a mathematic calculation function can be provided, in which the corresponding values are substituted to ascertain the reference data 18. A third variant can provide that the values for the reference data 18 can be read from a simulation model. Of course, combinations of the variants or the like can also be provided. The reference data 18 can be communicated to the beacon 12, which adopts this reference data 18 and uses it in generating the radio signal 14.

In order to improve the calibration, it can be provided that not only a single measurement with respect to a single distance value of the distance 22 is used, but multiple measurements are performed in different positions of the communication device 20 with respect to the beacon 12. Thereby, it can be achieved using statistical methods that the reference data 18 can be more accurately and/or reliably ascertained.

Further, it can be provided that a signal strength variation of the radio signal 14 can be used to be able to calibrate the beacon 12. For example, it can be provided that a transmission power of the radio signal 14 is increased to for example reduce noise. For this purpose, the communication device 20 can transmit a corresponding control signal to the beacon 12. The communication device 20 is positioned in a preset defined distance 22. The communication device 20 then measures a reception field strength of the radio signal 14. Based on the received reception field strength and the known distance 22, in a table, correspondingly associable reference data 18 for correspondingly lower transmission powers can be ascertained, in particular also calculated. In this approach, disturbances, which can be caused by noise, can in particular be reduced with respect to the calibration.

The embodiments exclusively serve for explaining the invention and are not intended to restrict it.

LIST OF REFERENCE CHARACTERS 10 system
12 beacon
14 radio signal
16 identification data
18 reference data
20 communication device
22 distance
24 distance sensor
26 reception unit
28 lighting device
30 center
32 communication link
34 header
36 first evaluation unit
38 reception unit
40 transmission/reception unit
42 second evaluation unit
44 transmission unit

The invention claimed is:

1. A method for operating a transmitter device; wherein the method comprises:
    wirelessly transmitting a radio signal with identification data specific to the transmitter device and reference data, wherein the transmitter device transmits the radio signal with signal properties at least partially dependent on the reference data to allow a communication device receiving the radio signal to ascertain a distance between the transmitter device and the communication device using reception-side signal properties and the reference data ascertained from the received radio signal;
    detecting the distance between the transmitter device and the communication device independently of the radio signal;
    ascertaining the reference data based on the reception-side signal properties of the radio signal and the detected distance,
    providing the ascertained reference data in the transmitter device to calibrate the transmitter device;
    transmitting, by the transmitter device, the radio signal on at least one of multiple radio channels, the reference data including reference data specific to a radio channel, which is associated with the respective at least one radio channel; and
    generating the radio signal for the respective at least one radio channel from the reference data specific to radio channel associated with the respective radio channel.

2. The method according to claim 1, further comprising transmitting, by the transmitter device, a preset initial radio signal as the radio signal for calibrating.

3. The method according to claim 1, further comprising performing the calibration for at least one of the radio channels.

4. The method according to claim 1, wherein the calibration occurs by detecting at least two distances to positions of the communication device different from each other with respect to the transmitter device.

5. The method according to claim 1, further comprising repeating the calibration.

6. The method according to claim 1, further comprising ascertaining the reference data using a table with preset values for the reference data.

7. The method according to claim 1, ascertaining the reference data using a mathematic formula.

8. The method according to claim 1, wherein the reference data is ascertained by the communication device and provided to the transmitter device.

9. The method according to claim 1, wherein the communication device communicates the reception-side signal properties of the radio signal to the transmitter device for ascertaining the reference data by the transmitter device.

10. The method according to claim 1, wherein the transmitter device is operated in a calibration mode for calibrating.

11. The method according to claim 1, wherein the reference data is provided to the transmitter device at least partially by a center.

12. The method according to claim 1, wherein transmitting the radio signal comprises transmitting a first radio signal on a first radio channel and transmitting a second radio signal on a second radio channel; wherein reference data for the first radio signal includes reference data specific to the first channel, and wherein reference data for the second radio signal includes reference data specific to the second channel.

13. A system comprising:
a transmitter device configured to wirelessly transmit a radio signal with identification data specific to the transmitter device and reference data, wherein the transmitter device is further configured to transmit the radio signal with signal properties—at least partially dependent on the reference data, wherein the transmitter device is further configured to transmit the radio signal on at least one of multiple radio channels, the reference data including reference data specific to radio channel, which is associated with the respective at least one radio channel;
and
a communication device configured to receive the radio signal and to ascertain a distance between the transmitter device and the communication device using reception-side signal properties and the reference data ascertained from the received radio signal;
a distance sensor configured to detect a distance between the transmitter device and the communication device independently of the radio signal;
an evaluation unit configured to ascertain the reference data depending on the reception-side signal properties of the radio signal and the detected distance and to provide the ascertained reference data in the transmitter device for calibrating the transmitter device.

14. A lighting device with at least one transmitter device of the system according to claim 13.

15. The lighting device according to claim 14, wherein the transmitter device is arranged in or immediately at the lighting device.

16. The system according to claim 13, wherein transmitting the radio signal comprises transmitting a first radio signal on a first radio channel and transmitting a second radio signal on a second radio channel; wherein reference data for the first radio signal includes reference data specific to the first channel, and wherein reference data for the second radio signal includes reference data specific to the second channel.

* * * * *